(12) United States Patent
Poncelet et al.

(10) Patent No.: US 6,179,898 B1
(45) Date of Patent: Jan. 30, 2001

(54) ALUMINOSILICATE ORGANIC-INORGANIC POLYMER

(75) Inventors: Olivier J. Poncelet; Jeannine Rigola, both of Chalon sur Saone; Danielle M. Wettling, Chatenoy le Royal, all of (FR)

(73) Assignee: Eastman Kodak Company, Rochester, NY (US)

(*) Notice: Under 35 U.S.C. 154(b), the term of this patent shall be extended for 0 days.

(21) Appl. No.: 09/256,597

(22) Filed: Feb. 23, 1999

(30) Foreign Application Priority Data

Feb. 23, 1998 (FR) .................................................. 98 02364

(51) Int. Cl.[7] .................................................. C22B 11/00
(52) U.S. Cl. .............................. 75/713; 423/24; 428/391; 428/405; 528/30
(58) Field of Search ............................ 75/713, 721, 722; 423/42, 24; 428/405, 391; 528/30

(56) References Cited

U.S. PATENT DOCUMENTS

| 2,304,427 | * | 12/1942 | Sibley ................................. | 75/713 |
| 2,726,141 | * | 12/1955 | Appell ................................. | 423/22 |
| 3,547,841 | * | 12/1970 | Overmars ........................... | 521/124 |
| 3,892,688 | * | 7/1975 | Motani et al. ...................... | 521/32 |
| 3,892,689 | * | 7/1975 | Motani et al. ...................... | 521/32 |
| 4,051,026 | * | 9/1977 | Cremers et al. .................... | 423/24 |
| 5,683,826 | * | 11/1997 | Poncelet et al. ................... | 110/147 |
| 5,756,628 | * | 5/1998 | Tani et al. . | |

FOREIGN PATENT DOCUMENTS

736249  * 10/1996 (EP) .

OTHER PUBLICATIONS

Mercier et al, "Access in Mesoporous Materials Advantages of a Uniform Pore Structure in the Design of a Heavy Metal Ion Adsorbent for Environmental Remediation" Advanced Materials, vol. 9, No. 6, 1997. pp. 500–503.*

Derwent Publication #1992–223551 1990 JP–0275026 Oct. 12, 1990.*

* cited by examiner

Primary Examiner—Roy V. King
Assistant Examiner—Tima McGuthry-Banks

(57) ABSTRACT

An organic-inorganic polymer comprising aluminosilicate having grafted thereon an organic radical having a —SH or —S(—CH$_2$)$_n$—S— group wherein n is from 0 to 4.

9 Claims, 2 Drawing Sheets

ALUMINOSILICATE ORGANIC-INORGANIC POLYMER

FIELD OF THE INVENTION

The present invention relates to a new aluminosilicate organic-inorganic polymer and its use in effluent treatment processes, in particular for the treatment of photographic effluents.

BACKGROUND OF THE INVENTION

Many manufacturing and processing methods generate effluents which, on the one hand, cannot be directly disposed of via the sewers because of their composition and, on the other hand, contain substances the recovery and reuse of which would be economically gainful. One example is the photographic processing industry, in which exposed silver halide photographic films and papers are treated in successive processing baths that are rich in chemicals. Such photographic film processing methods are well known (see for example, Chimie et Physique Photographiques; Pierre Glafkides, Vol. 2, Chap XL, pages 947–967).

In general photographic processing comprises several processing baths and one or more wash and/or stabilization baths. The build-up in the wash and/or stabilization baths of substances carried over from the preceding processing steps is especially detrimental not only to the stability of developed photographic images and to the good keeping of sensitometric characteristics, but also to the possibility of recycling these wash and stabilization baths, or discharging them to the sewers. After processing, the wash and stabilization baths are found to contain inorganic compounds, such as iron, silver, thiosulfate, and sulfate ions, or organic compounds which are, either substances used for development, or products coming from the reaction of these substances during development, or from the step of fixing or bleach-fixing.

The problem of discharging silver to the sewers is especially important because of new standards that apply to photographic processing methods. There are notably standards that set the maximum volume of water that should be used for washing 1 $m^2$ of photographic material. In particular, for processing X-radiographs, the current French standard permits the use of 15 liters of water per $m^2$ of single-coated radiographic product to be processed and 30 liters of water per $m^2$ of double-coated radiographic product, with discharge to the sewers of water containing a maximum of 1 ppm of silver. Reducing the permissible volume of water produces wash baths that are more concentrated in silver and thus more difficult to decontaminate. Therefore it is necessary to have a processing method that is both efficient and complies with the standards. It is also useful to have a method that is easy to apply and economic.

SUMMARY OF THE INVENTION

The objective of the present invention is to provide a new organic-inorganic polymer and the use of this polymer for the treatment of effluents containing silver in ionic form so as to reduce significantly the quantity of silver discharged with these effluents. This organic-inorganic polymer can be included as part of a device for treating effluent containing silver in the ionic form.

This objective is achieved according to the present invention, which relates to an aluminosilicate having grafted thereon an organic radical having a —SH or —S(—CH$_2$)$_n$—S— group wherein n is from 0 to 4.

The present invention further relates to a method for obtaining such a polymer, method which comprises hydrolysing an alkylalkoxysilane having the formula RSiR$^1{}_x$(OR$^2$)$_{3-x}$ wherein R is an alkyl group comprising a —SH or —S(—CH$_2$)$_n$—S— function wherein n is from 0 to 4, R$^1$ and R$^2$ are independently a methyl or ethyl group, x is 0 or 1, in the presence of an aluminosilicate inorganic polymer comprising active hydroxyl groups on the surface. "Active hydroxyl groups" are groups capable of reacting with alkylalkoxysilane.

The present invention further relates to a process for treating an effluent containing silver in ionic form, which comprises contacting said effluent with an organic-inorganic polymer comprising aluminosilicate having grafted thereon an organic radical having a —SH or —S(—CH$_2$)$_n$—S— group wherein n is from 0 to 4 in order to eliminate the silver in ionic form.

This process reduces the quantity of silver contained in the effluent substantially when the silver in the effluent is in ionic form.

The process of this invention is especially efficient for decontaminating photographic effluents, in particular for processing baths for silver halide photographic materials, for example wash baths, stabilization baths, and bleaching baths containing silver in ionic form. For photographic baths, the silver is in the form of an ionic complex.

The treatment process of the invention does not modify the properties of the effluent treated. In particular, the pH of the effluent before and after the invention treatment as well as the salt content of the effluent stay unchanged. In addition, the nature of the water making up the effluent to be treated does not modify the efficiency of the treatment.

In the scope of the invention, it is not worthwhile previously diluting the effluent to be treated.

BRIEF DESCRIPTION OF THE DRAWINGS

In the description below, reference will be made to drawings wherein.

DETAILED DESCRIPTION OF THE INVENTION

Figure 1:
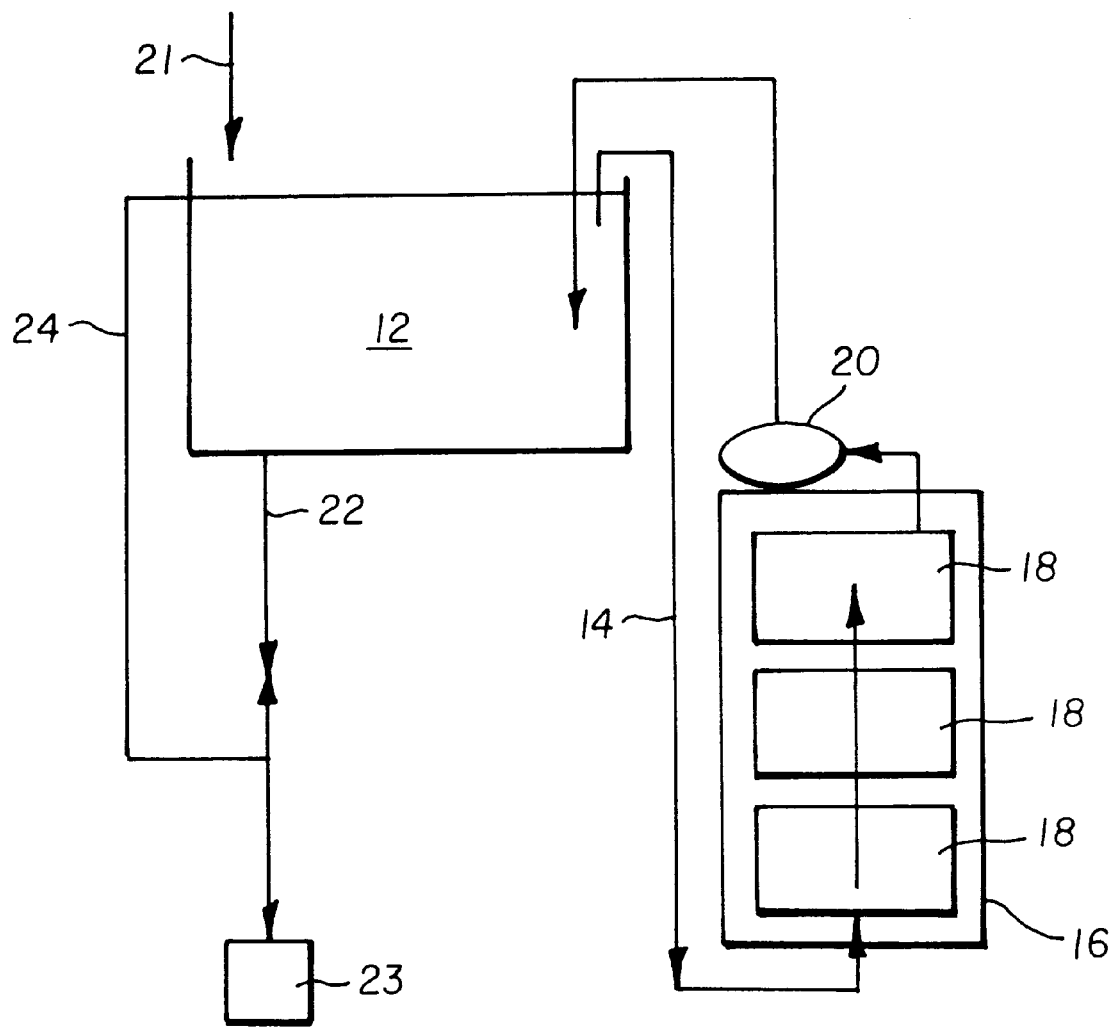
FIG. 1 is a diagrammatic flow chart showing an embodiment of the treatment process of the present invention applied to a photographic processing bath.

The aluminosilicate inorganic polymer of the invention can be obtained from any aluminosilicate having active hydroxyl groups on the surface.

In a particular embodiment, the aluminosilicate is in the form of fibers and the active hydroxyl groups are located on the surface of these fibers.

When an alkylalkoxysilane as defined above is hydrolyzed in the presence of an aluminosilicate inorganic polymer having active hydroxyl groups on the surface, the alkoxy groups of the alkylalkoxysilane react with the hydroxyl groups of the aluminosilicate to form a stable covalent bond. The aluminosilicate organic-inorganic polymer of the present invention is thus obtained.

The alkylalkoxysilanes that are useful for the invention can be mercaptoalkylalkoxysilanes of the formula HS—(CH$_2$)$_m$—SiR$^1{}_x$(OR$^2$)$_{3-x}$ wherein m is at least 1, R$^1$, R$^2$ and x being as defined above. Preferably m is from 1 to 4.

Useful mercaptoalkylalkoxysilanes for the invention are for example 3-mercaptopropyltrimethoxysilane,
3-mercaptopropyltriethoxysilane,
3-mercaptopropylmethyldimethoxysilane,
(mercaptomethyl)methyldiethoxysilane,
(mercaptomethyl)dimethylethoxysilane.

For the invention, alkylalkoxysilanes comprising an organic radical having a —S—S— function for example Bis[3(triethoxysilyl)propyl]tetrasulfite can also be used. Alkylalkoxysilanes having a crown ether organic radical containing the —S—S— or —S(CH$_2$)$_n$—S— function, n being from 1 to 4 can also be used.

When using a phyllosilicate as aluminosilicate inorganic polymer, the hydrolysis of the alkylalkoxysilane is carried out at a pH higher than 7. This pH is achieved by adding a base to the reaction medium, for example NH$_4$OH, NaOH, KOH. A pH higher than 7 allows the phyllosilicate to gel.

In addition to the alkylalkoxysilane described above, an alkylalkoxysilane modified by another non-hydrolyzable organic radical can be added to the aluminosilicate. With a suitable choice of organic radical, the properties of the organic-inorganic polymers of the invention can be modified in order to increase their efficiency. For example, an alkylalkoxysilane whose alkyl group is an haloalkyl can be added.

In this case, the polymer of the invention contains a bromoalkyl or chloroalkyl organic radical on the surface.

As an example, the use of bromopropyltrimethoxysilane allows the efficiency of the invention polymer to be increased for treating effluent containing silver in ionic form.

In a preferred embodiment, the invention polymer is obtained from imogolite type aluminosilicate. Imogolite is an aluminosilicate polymer that is in the form of fibers whose external surface comprises active hydroxyl groups. Imogolite exists in the natural state; it was described for the first time by Wada in J. Soil Sci. 1979, 30(2), 347–355. Imogolite can be synthesized by different methods. Examples of synthesis are described in Farmer U.S. Pat. Nos. 4,252,779; 4,241,035; and 4,152,404. A synthetic imogolite was described in PCT Patent Application WO 96/13459.

In order to implement the effluent treatment process, it can be necessary to shape the organic-inorganic polymer of the present invention.

This shaping which is within the realm of those skilled in the art should optimize contact between the organic-inorganic polymer of the invention and the effluent to be treated.

When using a phyllosilicate such as imogolite as inorganic polymer, the polymer of the present invention is in gel form.

In one embodiment of the invention, the organic-inorganic polymer in gel form is put in a container permeable to the effluent, for example a dialysis bag, a filter material, or a nonwoven material.

The organic-inorganic polymer can be formed in the presence of glass beads or fibers. The polymer then forms on the surface of these glass beads or fibers, the contact surface with the effluent being thus optimized. In this case, the organic-inorganic polymer can be used as it is or be put in a permeable container.

This process can be used advantageously in a photographic processing method that comprises passing a silver halide photographic material through a series of processing baths between which are wash and/or stabilization baths, these baths being treated with the invention treatment process.

As explained above, the photographic baths are charged with silver as argentodithiosulfate or with chemicals carried over from either the processing baths during the passage of the photographic material in these baths, or from the photographic material.

When this bath containing the silver as argentodithiosulfate is treated with the process of this invention, the silver content of the bath is decreased without modifying the pH or the salt composition of the bath. The bath thus treated can then be recycled as a photographic bath.

The baths treated in this way can be discharged to the sewers without additional treatment.

FIG. 1 is a diagrammatic flow chart of the treatment process of the invention applied to treating a wash bath in a silver halide photographic processing method. The Figure shows a washing tank 12 containing a wash bath. The tank is fitted with a fresh bath or water inlet 21, a means of drainage 22 and a means of discharging by overflow 24. The wash bath is sent by means of the pipe 14 into a treatment cartridge 16 housing one or more containers 18 that are permeable to the wash bath and contain the organic-inorganic polymer of the invention. At the outlet of the cartridge the solution obtained is returned by means of a pump 20 into the tank 12 where it is used again to wash photographic materials.

The wash bath recovered at the outlet of the overflow 24 or the drain 22 can be treated with a complementary treatment device 23, which can be a hydrotalcite cartridge, a nanofiltration device or an ion exchange resin. At the outlet of the device 23, the bath can be discharged to the sewers or be recycled in one of the processing baths in order to compensate for evaporation from the baths. It can also be used to make up new baths from the concentrate. It can be necessary before using this water in a photographic bath to adjust the pH and/or the salinity of the water in order to obtain the characteristics of industrial water.

The treatment cartridge 16 can house in addition to the container(s) 18, a container that holds a fibrous aluminosilicate inorganic polymer wherein an active organic compound is dispersed. Such a polymer is described in Patent Application EP 736,249.

The container holding the aluminosilicate inorganic polymer having dispersed therein active organic compound can be put in the cartridge 16 or in a separate treatment cartridge. When the solution passes this polymer, the solution becomes charged with the active compound that will limit the growth of microorganisms in the washing tank of the photographic processing method.

The treatment of effluents with the process of the invention is carried out at a temperature between 15 and 60° C. and preferably at ambient temperature.

As it is being used, the efficiency of the invention polymer reduces as the sulfur-containing sites of the invention polymer are saturated with silver ions. The silver contained in this polymer can then be recovered easily by firing the polymer.

In a particular embodiment, the treatment process of the invention is applied to a photographic bath containing silver in ionic form and comprises the following steps: (a) treating the bath with the organic-inorganic polymer of the invention, (b) treating the solution obtained in step (a) with a fibrous aluminosilicate inorganic polymer having dispersed therein an active organic compound, and (c) recycling the solution obtained in step (b) as a photographic bath.

In another particular embodiment, the aluminosilicate inorganic polymer in fibrous form having dispersed therein an active organic compound is pure imogolite wherein a biocide is dispersed. Biocide can be, for example a bactericide, a pesticide, an algicide or a fungicide. This inorganic polymer is described in detail in Patent Application EP 736,249. For example, the biocide can be selected from among the derivatives of thiazole, azole, sulfamide, organoarsenide, benzoic acid, sorbic acid, the quarternary ammonium salts of benzalkonium, the nitroalcohols, especially a benzisothiazolone or an isothiazolone. The quantity of dispersed biological growth inhibitor, is a function of the solubility of this inhibitor in water and of the useful life required for the processing bath. Especially useful biocides are the KATHON® family biocide commercially available from Rohm & Haas and the PROXEL® family biocides commercially available from ZENECA.

When the photographic bath is a wash or stabilization bath, the process of the invention can, after the treatment of the bath with the polymer of the invention and the recycling, also comprise an additional step which comprises passing the bath through a nanofiltration system, an ion exchange resin, or hydrotalcite. Water is then recovered which can be reused in one of the photographic processing baths to compensate for processing bath evaporation, for making up new baths using concentrates, or discharged to the sewers.

The following examples illustrate the invention.

EXAMPLE 1

Preparation of aluminosilicate (reference)

The aluminosilicate of this example was prepared using teachings from PCT Patent Application WO 96/13459.

16.7 mmoles of tetraethylorthosilicate $Si(OR)_4$ were added to 1000 ml of deionized water. The reaction mixture was stirred at ambient temperature for one hour, and then this solution was added to 31.2 mmoles of $AlCl_3,6H_2O$ in solution in 1000 ml of pure water. The mixture was stirred for 20 minutes, then the pH was adjusted to 4.5 with 1M NaOH. The solution became cloudy. When the solution became transparent again, 1M NaOH was added until a pH equal to 6.8 was achieved. A white gel was obtained that was centrifuged for 20 minutes at 2000 rpm. The gel was collected and was brought into solution with 5 ml of a mixture comprising 1M HCl and 2M acetic acid. The volume was made up to 2 l with water. The solution contained 30 mmoles of Al, 16.6 mmoles of Si, 5 mmoles of HCl and 10 mmoles of acetic acid. This solution was kept at 5° C.

This solution was then diluted with deionized water to achieve a concentration in Al of 10 mmoles/l. The diluted solution was heated for 5 days at 96° C., and then it was filtered through an ultrafiltration membrane with a separation power of 10,000 Dalton (membrane manufactured by AMICON). A clear solution was obtained containing Al and Si in a ratio Al:Si of 1.8.

EXAMPLE 2

Preparation of the organic-inorganic polymer of the invention

To 20ml of imogolite prepared according to the Example 1 method and containing 2.5 g/l of(Al+Si), was added a solution of 3-mercaptopropyltrimethoxy-silane in anhydrous methanol ($10^{-3}$ mole in 2 ml methanol) containing some drops of $NH_4OH$. The solution geled (pH>7) and hydrolyzed in time.

Figure 2:
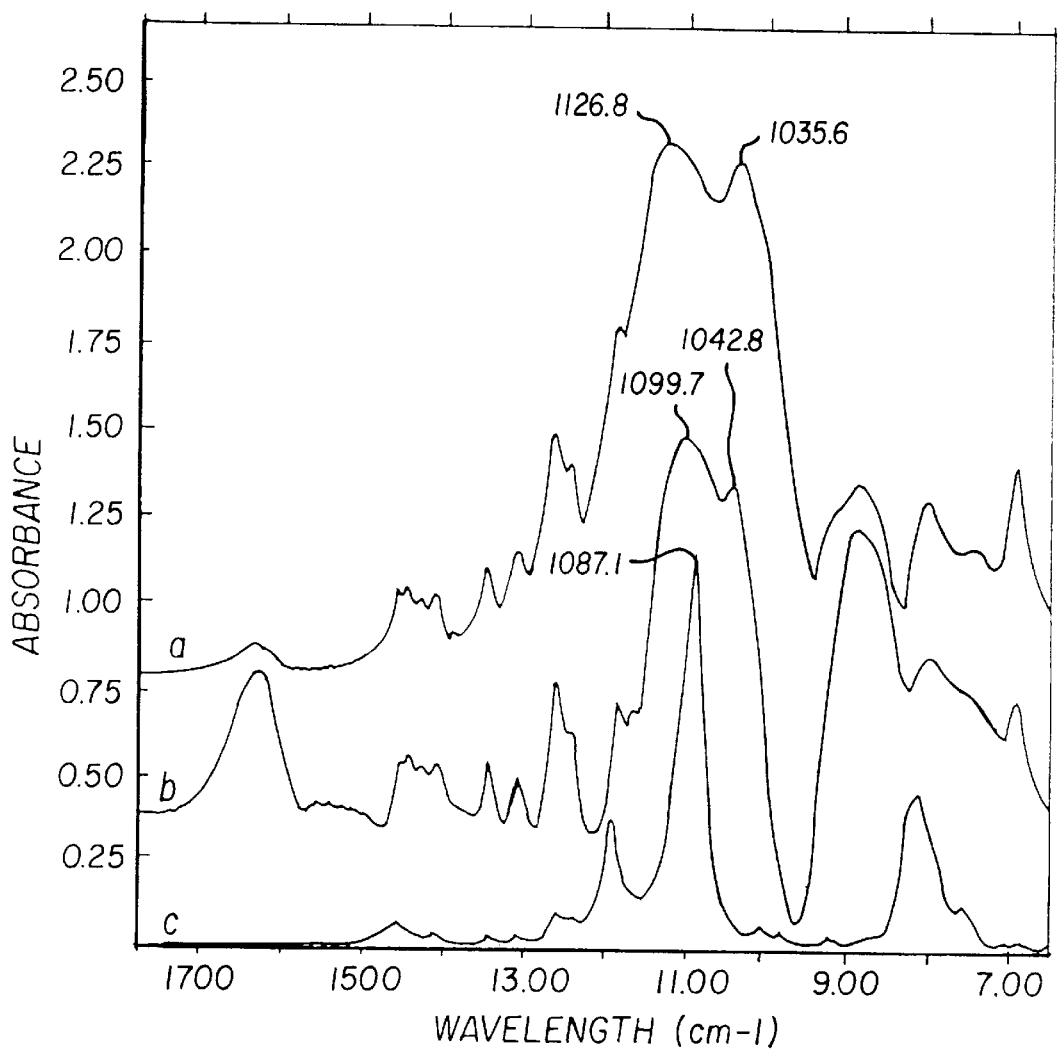
FIG. 2 is a representative infrared spectra of the inorganic polymer of the invention, of the initial alkylalkoxysilane, and of the siloxane obtained after hydrolysis of the same alkylalkoxysilane.

FIG. 2 shows (a) the infrared spectrum of the solution described above after hydrolysis, (b) the infrared spectrum of alkylalkoxysilane before hydrolysis, and (c) the infrared spectrum of alkylalkoxysilane hydrolyzed in the absence of imogolite.

The infrared spectrum (b) shows a band at 1087 $cm^{-1}$ which is characteristic of the Si—O bond. The infrared spectrum (c) shows a doubling of the Si—O bond characteristic band (bands at 1099.7 and 1042.8 $cm^{-1}$) that indicates the formation of polysiloxane by hydrolysis. The infrared spectrum (a) also shows a doubling Si—O bond characteristic band, that indicates that hydrolysis has occured, However, these bands are shifted in relation to the spectrum (c) (1126.8 and 1035.6 $cm^{-1}$). This band shift shows that the polymer obtained is not a polysiloxane but that the siloxane is grafted by hydrolysis onto the imogolite. In addition, the infrared spectrum of the product of the invention shows that the organic part is not affected by the grafting and therefore stays available for trapping silver. Comparison of these spectra clearly shows the structure of the inorganic polymer of the invention.

EXAMPLE 3

Treating a wash bath

The polymer obtained by hydrolysis in the form of an opaque gel (20 ml) was put in a dialysis bag. The bag was put in a beaker containing 200 ml of a wash bath coming from Kodak X-OMAT® M6B photographic processing. This wash bath contained 23.1 mg/l silver as argentodithiosulfate.

The same experiment was carried out by filling the dialysis bag with the pure imogolite obtained in Example 1 (reference).

After 2 hours, the amount of silver in the wash bath was measured. The amounts of silver contained in the wash bath were determined by ICP (induced coupled plasma)

The results are given in Table 1 below.

TABLE 1

|  | Invention | Reference |
| --- | --- | --- |
| Silver amount mg/l | 12.3 | 22 |

The result obtained with the reference shows that pure imogolite allows to reduce the quantity of silver in very low proportions. In the case of the polymer of the present invention, the amount of silver contained in the bath is strongly reduced. These results demonstrate the efficiency of the invention polymer.

The invention has been described in detail with particular reference to certain preferred embodiments thereof, but it will be understood that variations and modifications can be effected within the spirit and scope of the invention.

What is claimed is:

1. A method for treating an effluent containing silver in ionic form, which comprises contacting said effluent with an imogolite organic/inorganic polymer comprising aluminosilicate having grafted thereon an organic radical having a SH or S—$(CH_2)n$—S— group wherein n is from 0 to 4 in order to eliminate the silver in ionic form.

2. The method claim 1 wherein said effluent is a photographic bath.

3. The method of claim 2 wherein the contacting of said photographic bath with said organic/inorganic polymer is followed by the steps of:

treating said effluent with an imogolite aluminosilicate inorganic polymer in fiber form having dispersed therein an active organic compound, and recycling the effluent treated as a photographic bath.

4. The method of claim 3 wherein said aluminosilicate inorganic polymer in fiber form having dispersed therein an active organic compound is pure imogolite having dispersed therein biocide.

5. The method of claim 4 wherein said biocide is a bactericide, a pesticide, an algicide, a biocide or a fungicide.

6. The method of claim 5 wherein said biocide is selected from the group consisting of the derivatives of thiazole, azole, sulfamide, organoarsenide, benzoic acid, sorbic acid, the quarternary ammonium salts of benzalkonium, the nitroalcohols.

7. The method of claim 6 wherein said biocide is a benzisothiazolone or an isothiazolone.

8. The method of claim 3 wherein the treated bath finally pass through a system of nanofiltration, an ion exchange resin, or hydrotalcite.

9. The method of claim 2 wherein said photographic bath is a photographic washing or stabilizing bath.

\* \* \* \* \*